(12) United States Patent
Kohlhoff

(10) Patent No.: US 10,650,609 B2
(45) Date of Patent: May 12, 2020

(54) VIRTUAL PROTOTYPING AND ASSEMBLY VALIDATION

(71) Applicant: SAP SE, Walldorf (DE)

(72) Inventor: Stephan Kohlhoff, Darmstadt (DE)

(73) Assignee: SAP SE, Walldorf (DE)

( * ) Notice: Subject to any disclaimer, the term of this patent is extended or adjusted under 35 U.S.C. 154(b) by 17 days.

(21) Appl. No.: 15/903,033

(22) Filed: Feb. 23, 2018

(65) Prior Publication Data
US 2019/0266804 A1    Aug. 29, 2019

(51) Int. Cl.
G06T 19/20 (2011.01)
G06T 19/00 (2011.01)
G06F 3/01 (2006.01)
G06T 17/10 (2006.01)

(52) U.S. Cl.
CPC .............. *G06T 19/20* (2013.01); *G06F 3/013* (2013.01); *G06F 3/017* (2013.01); *G06T 17/10* (2013.01); *G06T 19/006* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 6,240,328 B1 | 5/2001 | La Londe et al. | |
| 6,826,500 B2 | 11/2004 | Linthicum et al. | |
| 8,027,745 B1* | 9/2011 | Freeze | G06Q 10/06 700/106 |
| 8,401,687 B2 | 3/2013 | Kohlhoff | |
| 8,624,924 B2 | 1/2014 | Dobbins et al. | |
| 9,390,534 B2 | 7/2016 | Enomoto | |
| 10,007,350 B1* | 6/2018 | Holz | G06F 3/017 |
| 10,114,127 B2* | 10/2018 | Brown | G06F 3/04842 |
| 2002/0123812 A1* | 9/2002 | Jayaram | G06T 19/20 700/98 |
| 2004/0107080 A1* | 6/2004 | Deichmann | A61F 11/08 703/6 |
| 2008/0165189 A1 | 7/2008 | Nakayama et al. | |

(Continued)

OTHER PUBLICATIONS

Commercial Technologies for Maintenance Activities; Assembly Design & Documentation Project; Mar. 2006; p. 1-15; National Center for Manufacturing Sciences; Ann Arbor, MI.

*Primary Examiner* — Xiao M Wu
*Assistant Examiner* — Steven Z Elbinger
(74) *Attorney, Agent, or Firm* — Fish & Richardson P.C.

(57) ABSTRACT

In virtual prototyping and assembly validation, visual images of physical components of a product are captured through a camera inbuilt in an augmented reality/virtual reality (AR/VR) wearable device, registered as 3D models in a virtual workbench. When a first voice command is received to initiate recording, continuous visual motion signals are received as trajectories corresponding to assembling a 3D model of a component. They are recorded as an installation view of the component. The 3D model of the component is dynamically validated while assembling the virtual workbench. The installation view of the component and an installation view of a next component is stored as an animation assembly file. The animation assembly file may be extracted from the AR/VR application and stored in a visual enterprise application as a visual enterprise format such as visual design stream.

20 Claims, 14 Drawing Sheets

(56) References Cited

U.S. PATENT DOCUMENTS

| | | | |
|---|---|---|---|
| 2011/0115878 A1* | 5/2011 | Noteware | H04N 7/147 |
| | | | 348/14.12 |
| 2013/0191094 A1 | 7/2013 | Akahoshi et al. | |
| 2015/0058052 A1 | 2/2015 | Kohlhoff | |
| 2016/0171772 A1* | 6/2016 | Ryznar | G02B 27/017 |
| | | | 345/633 |
| 2016/0314704 A1 | 10/2016 | Bell | |
| 2018/0025531 A1* | 1/2018 | Terahata | G02B 27/017 |
| | | | 345/421 |
| 2018/0131898 A1* | 5/2018 | Guzik | H04N 5/77 |
| 2018/0211442 A1* | 7/2018 | Kuribara | H04N 13/332 |
| 2018/0286127 A1* | 10/2018 | Evertt | G06T 11/206 |
| 2019/0035149 A1* | 1/2019 | Chen | G06T 15/04 |

\* cited by examiner

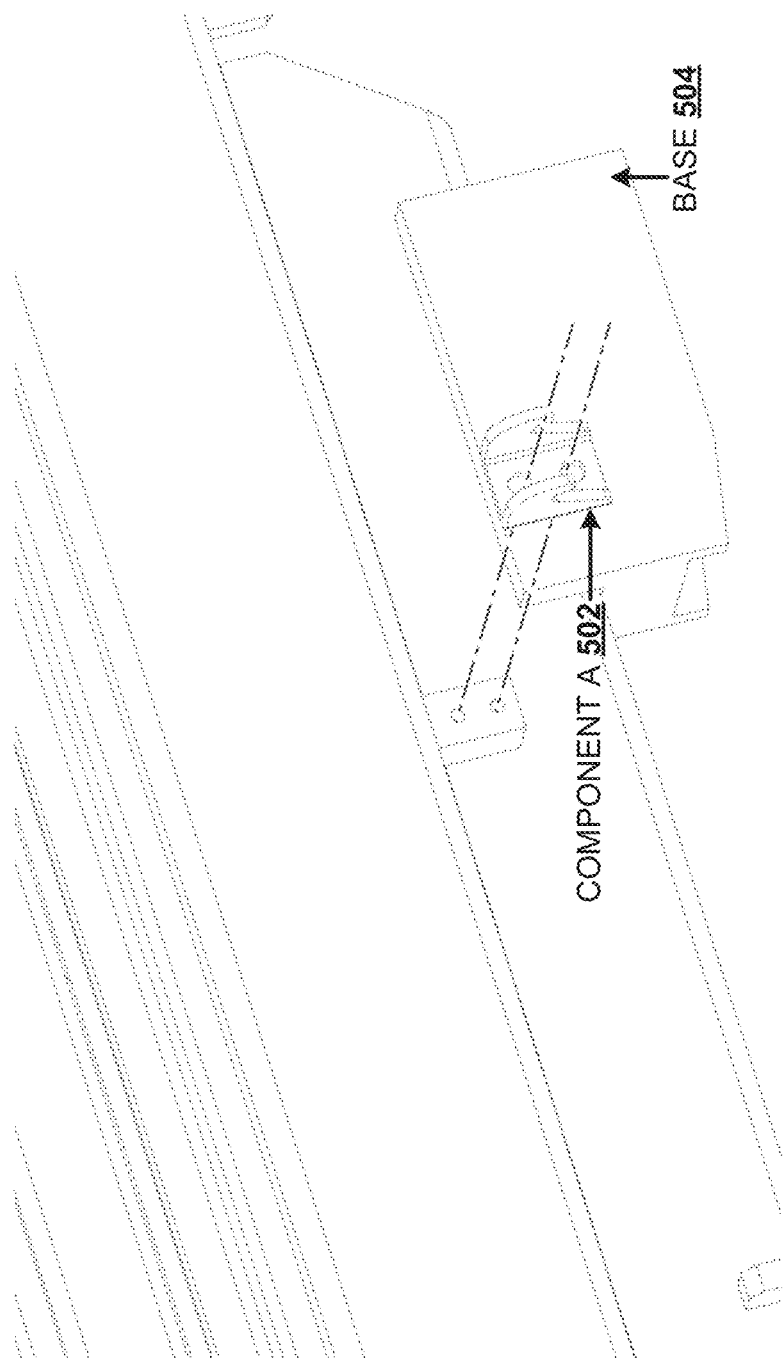

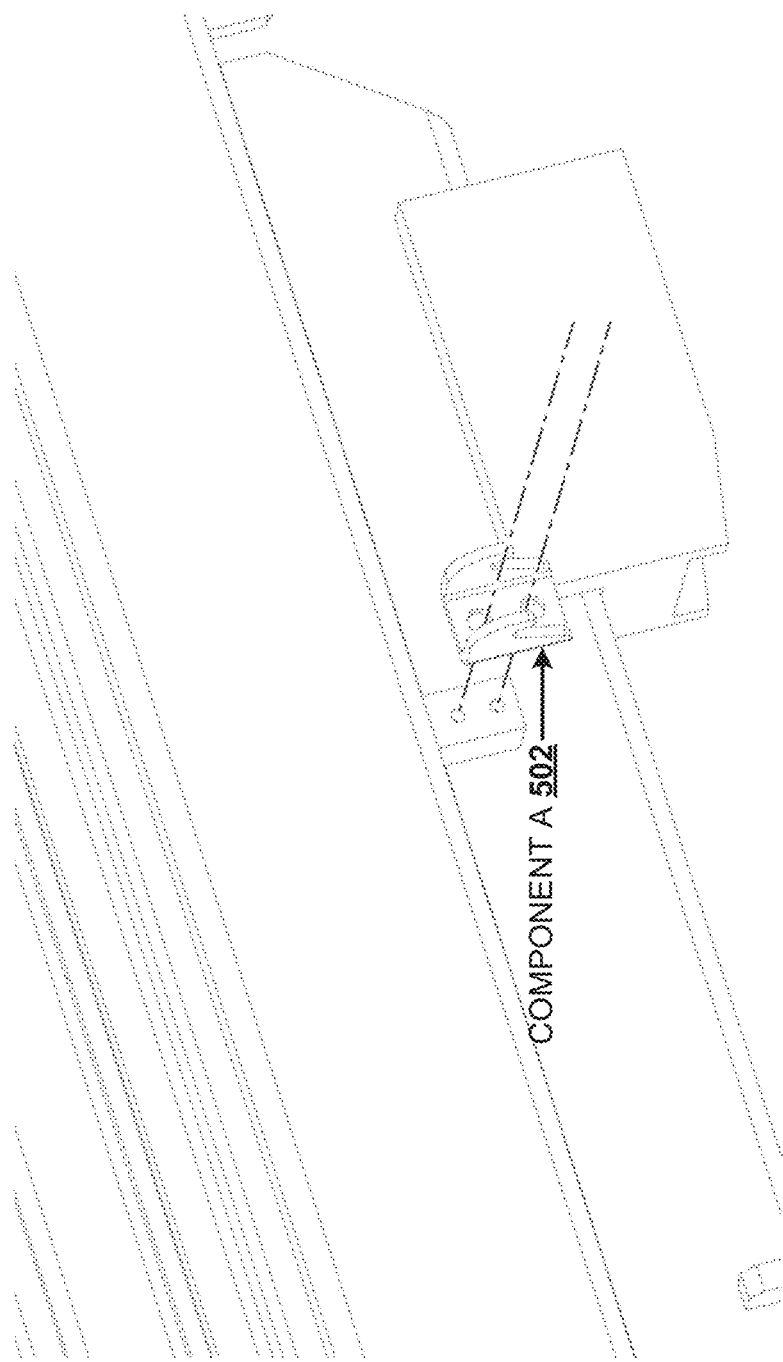

VIRTUAL PROTOTYPING AND ASSEMBLY VALIDATION

BACKGROUND

In manufacturing industry, various components or subcomponents associated with a product are manufactured, and a sequence of process or steps are performed to assemble the various components to a final product. The assembly process may be manual or visually aided, where the creation of the sequence of assembly process shows the order in which components are to be assembled. These manufacturing components are the basis for production planning and manufacturing execution. The visualization provides the user with a capability to assess the sequence of assembly dynamically in comparison to a pure textual planning, where screen shots and printed drawings have been the only visual aid in the past. However, this type of visualization is static in nature. The actual assembling and installation of a structure requires a dynamic validation as the structure is moved and positioned into its final location. Typically, this movement is performed by a shop floor operator assembling the structure. There must be enough clearance for the structure and the operator's hand and potentially the tools which are required for the installation process. It is challenging to assemble the structures in a large sized or complex product using static visual aids and manual validation.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 5A-FIG. 5C illustrates assembling components of a product, according to one embodiment.

DETAILED DESCRIPTION

Figure 1:
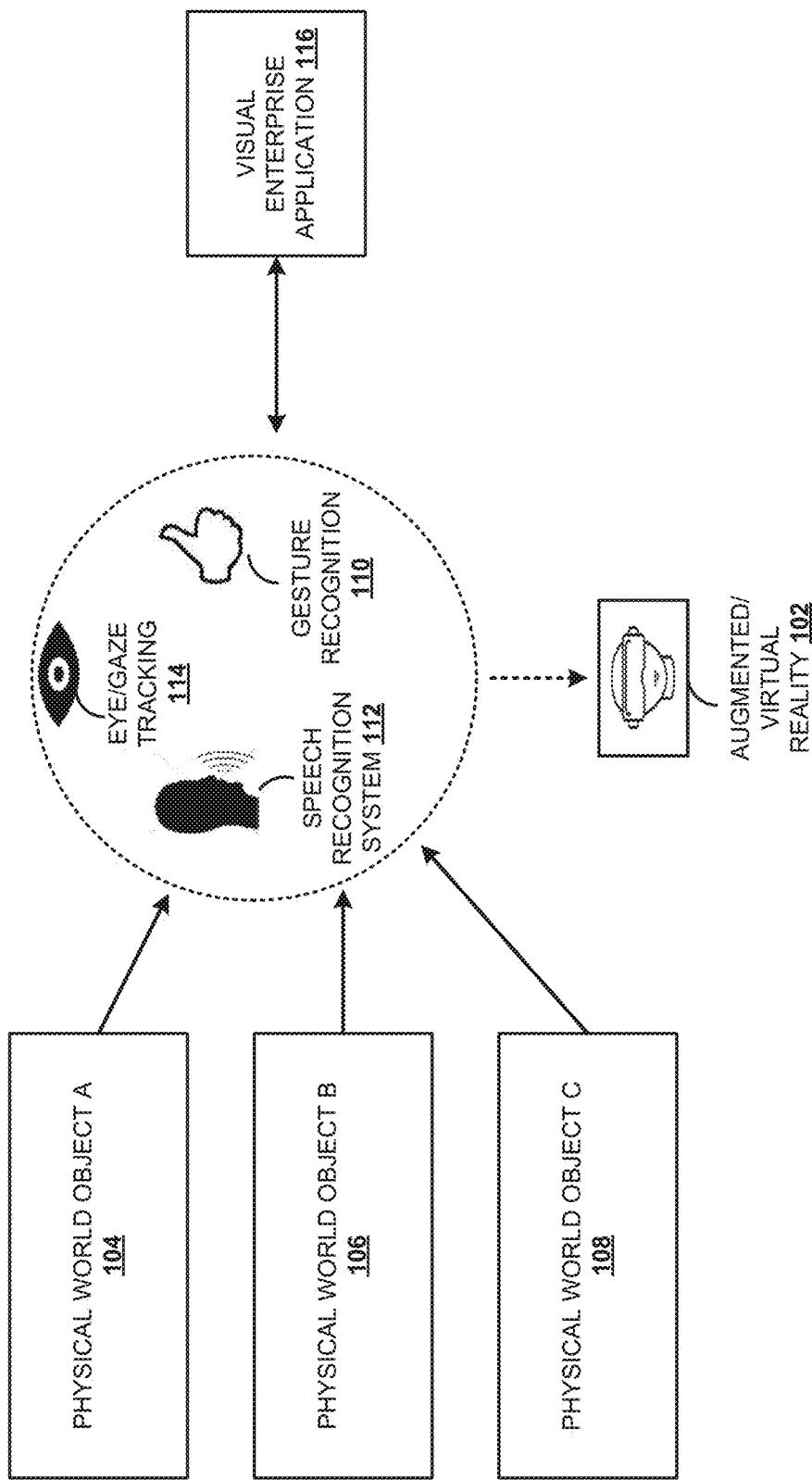
FIG. 1 is a block diagram illustrating architecture of virtual prototyping and assembly validation, according to one embodiment.

Embodiments of techniques of virtual prototyping and assembly validation are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Manufacturing Execution (ME) is a powerful, enterprise-level, scalable, manufacturing business solution that enables global manufacturers to manage and control manufacturing and shop floor operations. It provides a multi-faceted set of features that integrates business systems to the shop floor, allowing for complete component and material-level visibility for single and global installations. ME ensures that product is designed and built right the first time, collecting data from multiple sources and integrating data systems with shop floor activities to create one comprehensive production record. Genealogy is the tracking of a product's assembly through the manufacturing process such as tracking information about components, verifying that all the required components are assembled from start to end, availability of components, etc. A shop floor master data is defined and mapped with infrastructure in ME, and it includes details on what is manufactured in the shop floor. Routing is made up of a series of operations called routing steps and it represents how work is processed on the floor. These steps explain how manufacturing of a product takes place in the shop floor.

With Augmented reality (AR), a live direct or indirect view of a physical, real-world environment with objects are augmented using AR applications. The real-world environment and objects are captured through a camera and they are augmented into virtual objects such as 3D models in the AR applications. The camera is integrated with wearable technology such as smart glass, head mounted display, etc. In this case, the camera is used to identify the observers position, which allows calculating the position, view, and perspective of the virtual object, which is merged into the scenery or a virtual workbench on the display device. With Virtual reality (VR,) displaying and experiencing a real-world environment by a computer generated interactive virtual environment is feasible. The physical aspect of the virtual environment may be experienced via visual and sensual interaction. Besides a visual stereographic display, which provides a true 3D visual experience, the use may wear data gloves, which not only receive data but can send data like pressure or vibrations to the hand to simulate the touch of an object. Combination of AR/VR technology enabled wearable devices enables virtual prototyping of assembly validation in a manufacturing process.

FIG. 1 is a block diagram illustrating architecture of virtual prototyping and assembly validation, according to one embodiment. A user may wear an augmented/virtual reality (AR/VR) device such as head-mounted display or smart glass 102. The camera inbuilt in the AR/VR device can capture and display live imagery/visual image from the physical world and superimpose on real-world view or virtual-world view referred to as user's field of view. The physical objects or real-world objects such as components required for manufacturing a product are captured as 3D models using the AR/VR device. For example, visual images of physical world objects such as physical world object A 104, physical world object B 106, physical world object C 108, etc., are captured as 3D models using the inbuilt camera in the AR/VR device such as the smart glass 102. The captured 3D models of components may be superimposed in a virtual workbench for assembling. The individual components are captured as 3D models, and the visual images of the physical components are superimposed as 3D models in the virtual workbench. The AR/VR device uses a sensory array for hand interactions and positional tracking, visual field view, and resolution display. The functionalities in the AR/VR devices help gauge record and upload various data points associated with the components, as the user visually views them through the AR/VR wearable device. The various data points include dimension, shape, geospatial location, global positioning system location, internal temperature of various components, etc. User is provided with a virtual 3D model of a physical world component to assemble the product. AR/VR wearable device also uses gesture recognition 110 to interpret the user's body movement by visual detection or from sensors embedded in a peripheral device such as wand, stylus, glove, etc., speech recognition system 112 to translate user's words into instructions or commands, etc., and eye/gaze tracking 114 is used to process the visual image using various algorithms such as eye direction estimation algorithm. The virtual 3D models along with gestures and movements associated with the 3D models are captured and stored in visual enterprise application 116.

Figure 2:
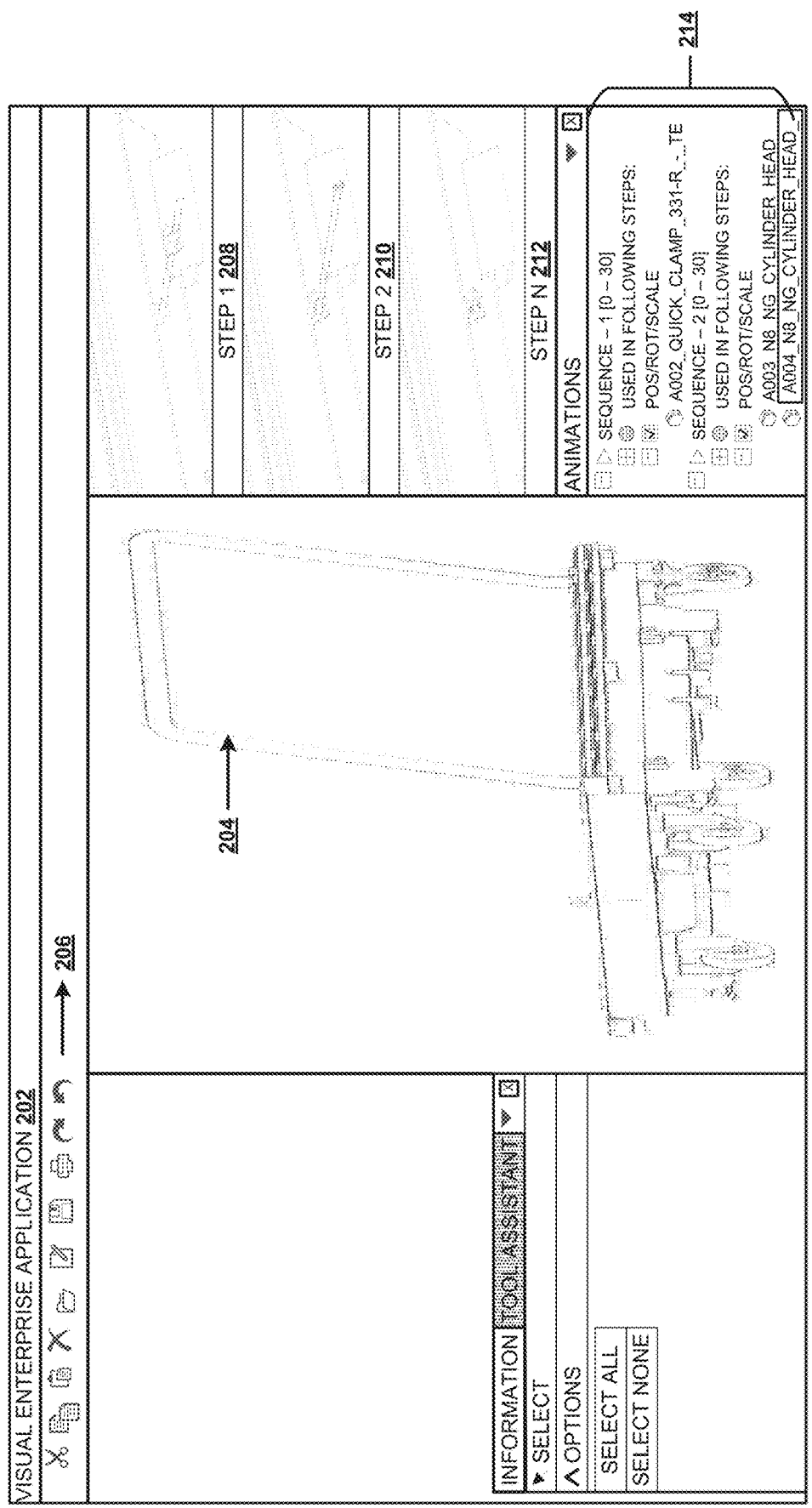
FIG. 2 is a block diagram illustrating user interface of virtual enterprise application, according to one embodiment.

FIG. 2 is a block diagram illustrating user interface of a visual enterprise application, according to one embodiment. Visual enterprise application 202 is used to manage 2D, 3D, animation, video and audio associated with the captured virtual objects. In the visual enterprise application 202, the number of vertices, sub-components and the texture bitmaps in the 3D models can be viewed as shown in 204. Various operations 206 can be performed on the 3D models such as pan, rotate, zoom, etc., to explore the 3D models, add comments, component details, sub-components, tags and textures. Various components associated with a product is assembled and the sequence of assembling is stored as animations per installed component in the visual enterprise application 202. The animations per installed components are stored as steps such as 'step 1' 208, 'step 2' 210 and 'step N' 212. When the individual steps such as 'step 2' 210 is clicked, animations that include sequence of continuous visual motion signals corresponding to the 'step 2' 210 is displayed in a user interface associated with the virtual enterprise application 202. For example, the animations including sequence of continuous visual motion signals are shown in window 214 as sequence 1, sequence 2, etc. In one embodiment, the animations per installed components may be stored in AR/VR application as an animation assembly file and sent to the visual enterprise application 202 using interfaces such as application programming interfaces (API's). In one embodiment, the AR/VR application and the visual enterprise application may be integrated in a single application.

Figure 3:
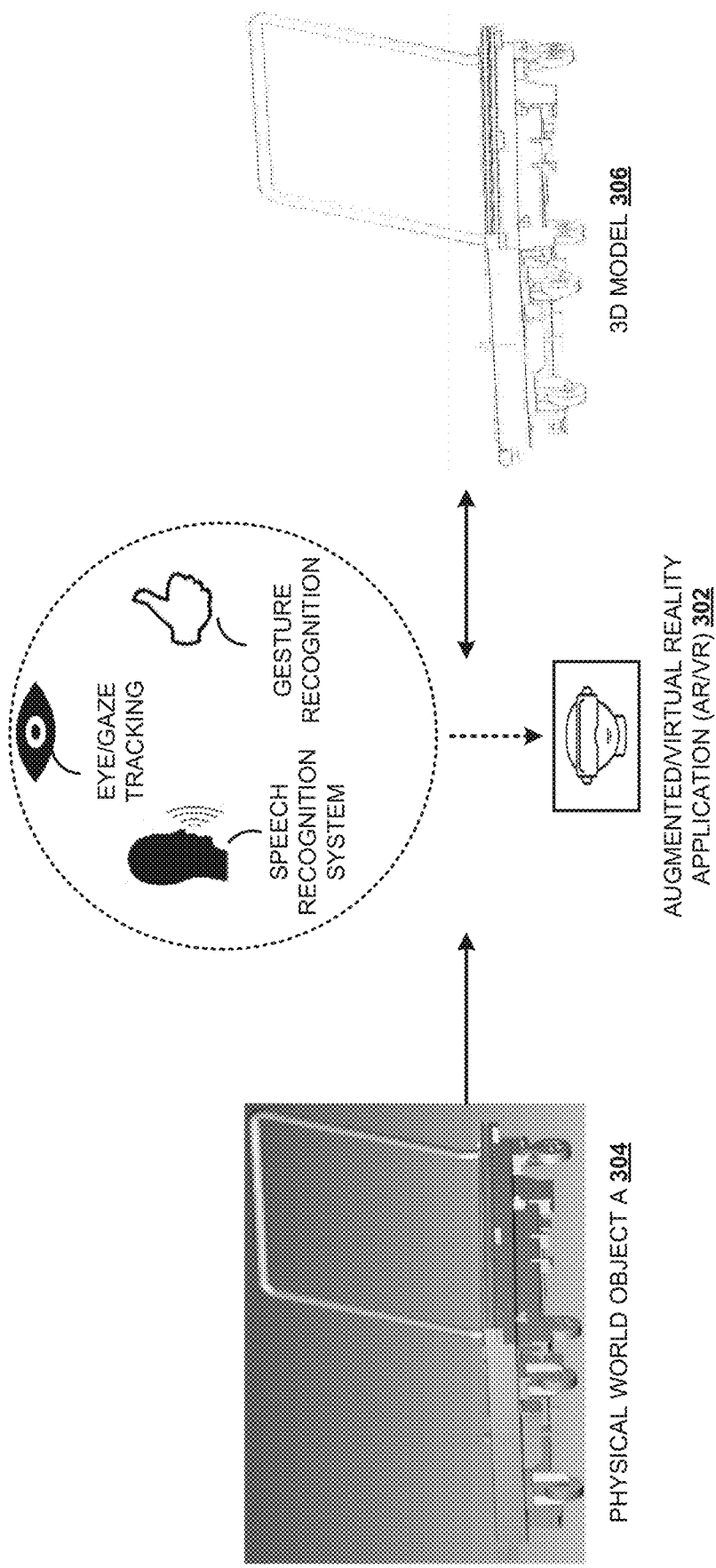
FIG. 3 illustrates functionalities of AR/VR application, according to one embodiment.

FIG. 3 illustrates functionalities of AR/VR application, according to one embodiment. Significant functionality of AR/VR application 302 is that how realistically they integrate augmentation with the real world. AR/VR application 302 derives real world coordinates, independent from the images captured by camera in the AR/VR wearable devices. This process is called image registration where different sets of data are transformed into one coordinate system and uses video tracking that is the process of locating a moving object over time using the camera. The video tracking involves receiving or capturing continuous visual motion signals as trajectories corresponding to the moving object. The first stage is to detect interest points and fiducial markers i.e., an object placed in the field of view for use as a point of reference or measure in the camera images. This step can use feature detection methods like corner detection, blob detection or thresholding, and other image processing methods. The second stage restores a real-world coordinate system from the data obtained in the first stage. Various mathematical methods used in the second stage include projective geometry, geometric algebra, rotation representation, non-linear optimization, etc. Augmented reality markup language (ARML) is a data standard which consists of XML grammar to describe the location and appearance of virtual objects in the scene and allow dynamic access of properties of virtual objects. The AR/VR application 302 captures physical-world object A 304 based on the techniques explained in the first stage and the second stage above and transforms the physical-world object A 304 to 3D model 306.

Figure 4:
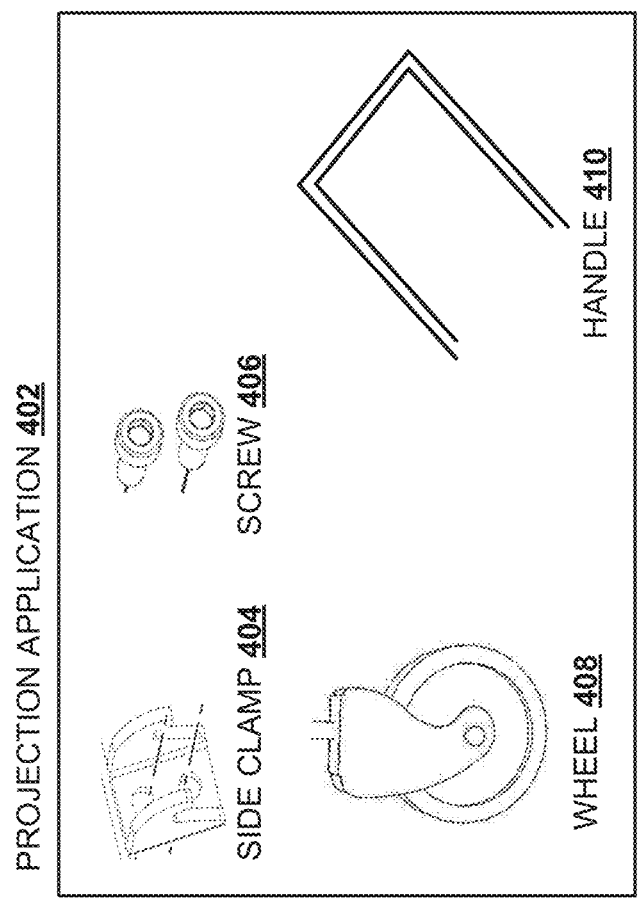
FIG. 4 illustrates a 3D model of a product, according to one embodiment.

FIG. 4 illustrates a 3D model of a product, according to one embodiment. For example, a product such as baggage cart may include various components such as base, side clamp, screw, handle, wheels, etc. The sequence of assembly of the various components in the baggage cart is pre-configured and provided as input from a visual enterprise application to a ME where the actual assembling of the baggage cart is performed. The assembly of individual components to create the baggage cart may be performed by an operator by wearing a AR/VR wearable device such as a smart glass with a built-in camera and an integrated viewer. A 3D representation of the components of the product are registered and loaded in the viewer before starting the assembling process. The 3D model of the components of the product is projected in a display in the AR/VR device. The captured 3D model of the components of the product may be superimposed in a virtual workbench (not shown). The operator can walk around the individual components of the product i.e., the viewer application changes orientation and distance to the 3D model of the product according to the movement of the user. Some of the components captured as 3D models are shown in projection application 402 from the viewer integrated in the AR/VR smart glass. The components shown in the projection application 402 are side clamp 404, screw 406, wheel 408, handle 410, etc. The sequence of assembly of the various components in the baggage cart makes the virtual prototype build very efficient.

Figure 5C:
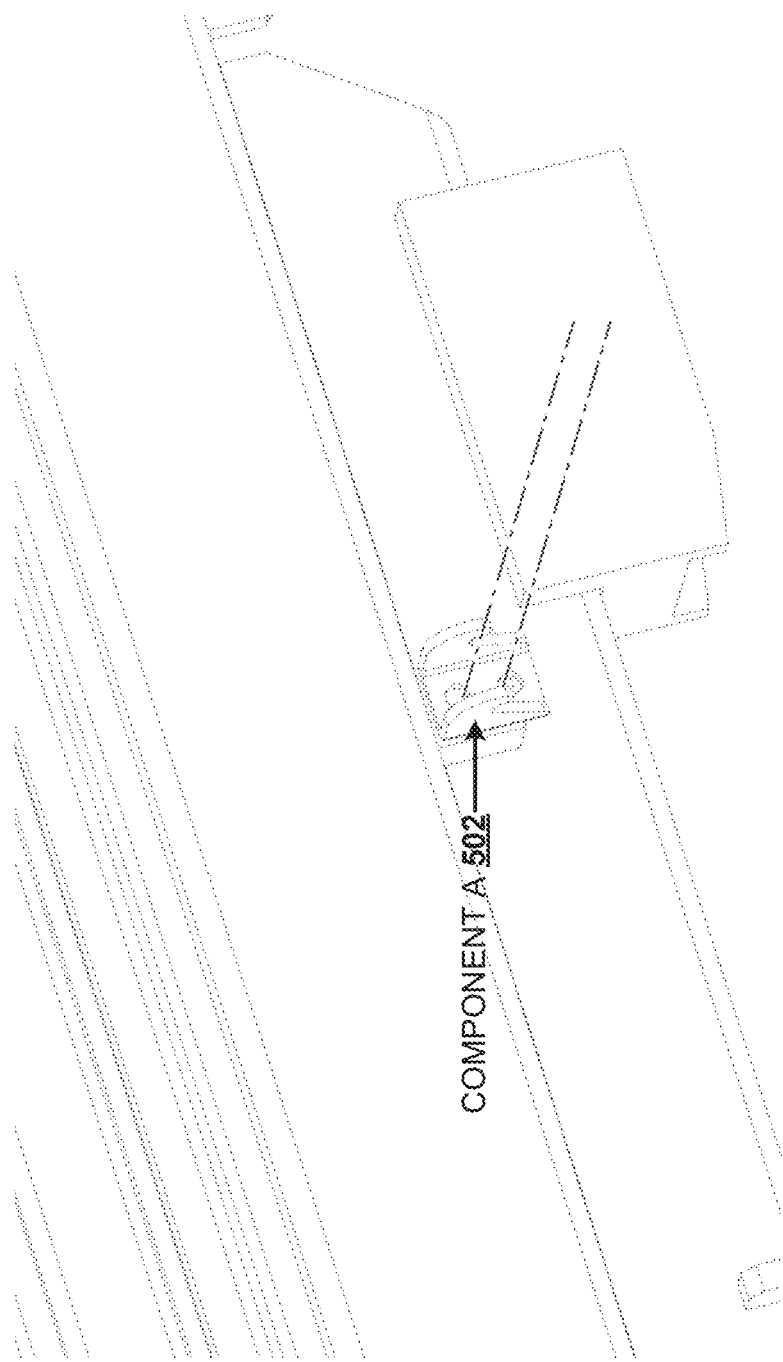

FIG. 5A-5C illustrates assembling components of a product, according to one embodiment. An operator wearing a AR/VR wearable device such as a smart glass may start recording assembling by a vocal/voice command like 'start recording'. The voice command 'start recording' may be referred to as a first voice command. The individual 3D component e.g. clamp, turns semi-opaque in a virtual workbench. The operator may pick up the clamp referred to as component 'A' 502 virtually by using a controller, or by a voice command 'next part', where the component 'A' 502 appears in the hand of the operator (not shown), based on the capability of the AR/VR application. The voice command 'next part' may be referred to as a second voice command. Then the operator 'moves' the component 'A' 502 to install it to base 504, the AR/VR device tracks the hand movement/gesture of the operator and the component 'A' 502 'follows' the hand movement. The hand movement of the operator is received as continuous visual motion signals referred to as trajectories corresponding to assembling the component 'A' 502. With a 'show installation' command, the component gets highlighted in its final location in the product to help the operator find the right location. As the operator 'moves' the component 'A' 502, the component 'A' 502 is moved closer to its destination as shown in FIG. 5B, and the gesture of hand movement is shown as dotted lines. Once the operator holds the component close to the final position the 'snap installation' command can be invoked to move the component 'A' to its final position as shown in FIG. 5C. The set of figures SA to 5C are captured as the installation view of the component 'A'. The sequence of these voice commands may be repeated to install the next component such as screw referred to as component 'B'.

Figure 6A:
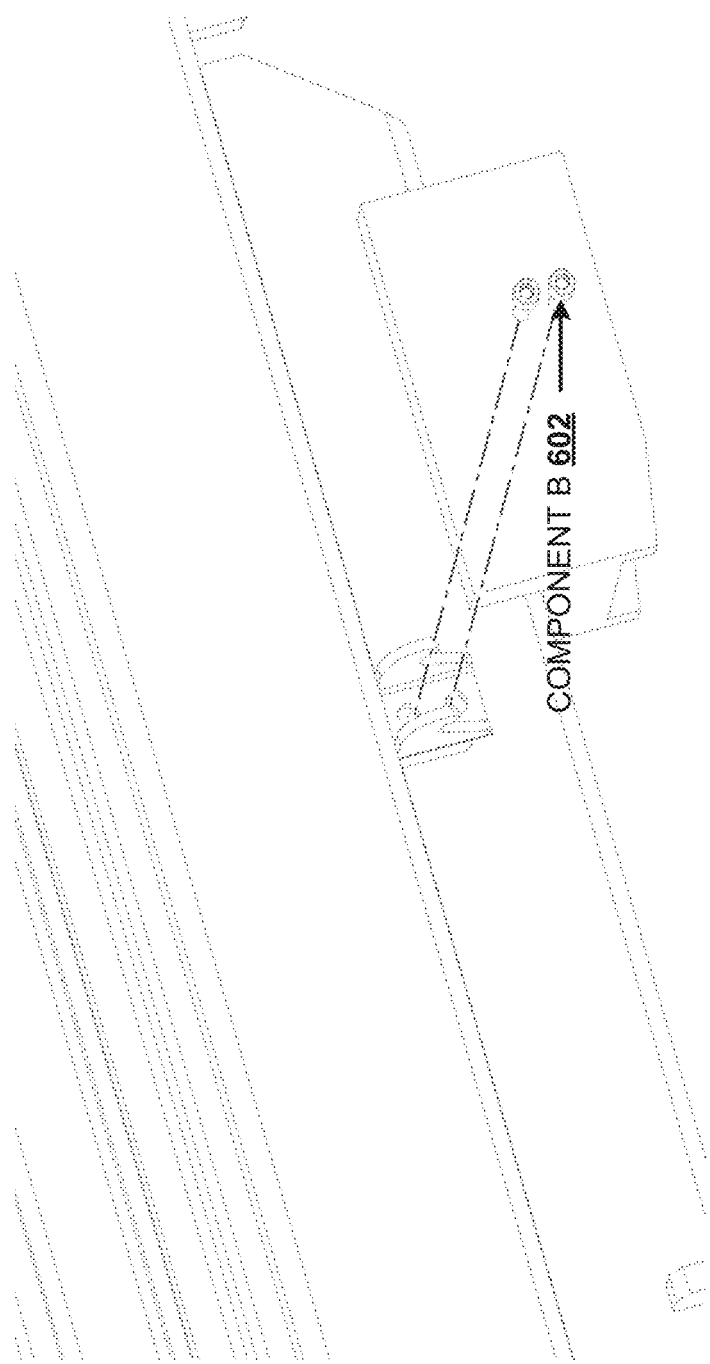
FIG. 6A-FIG. 6E illustrates assembling components of a product, according to one embodiment.
Figure 6B:
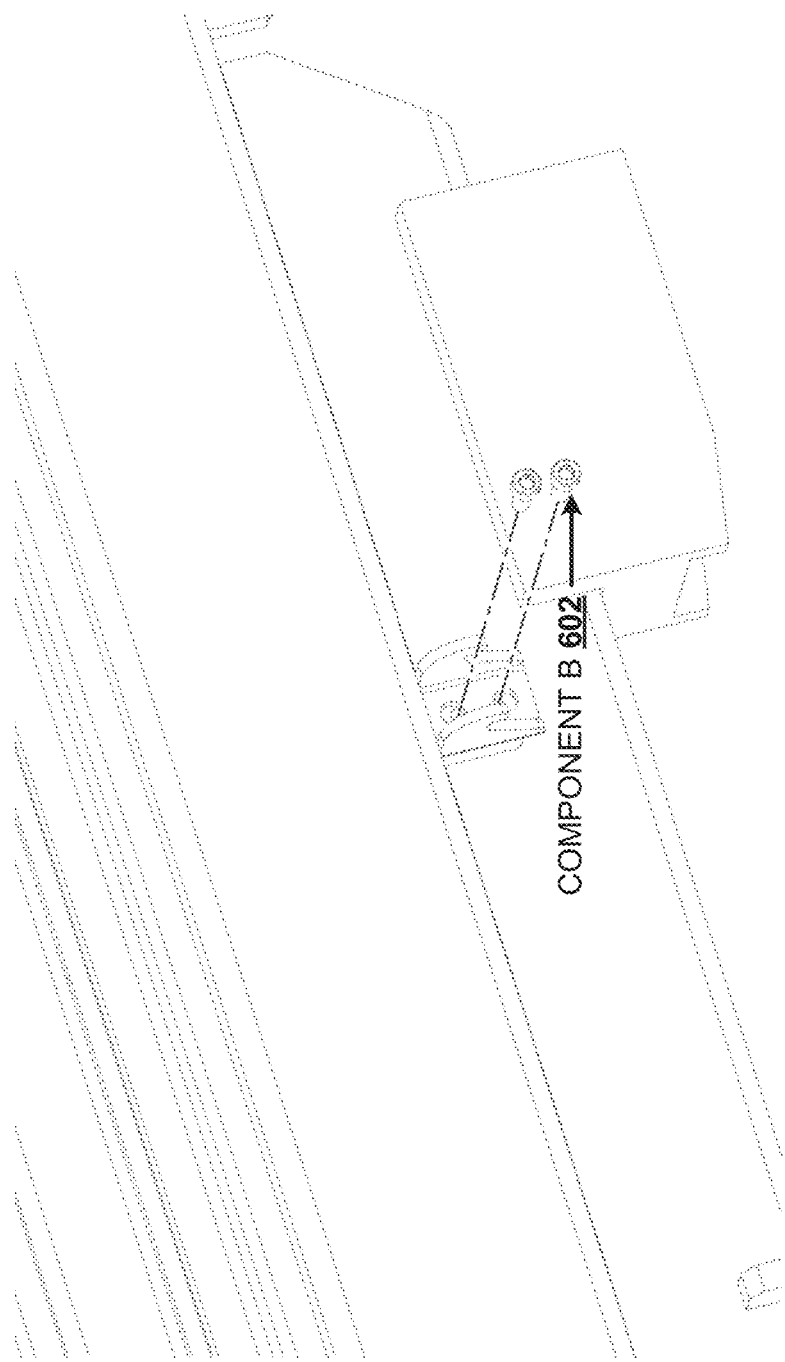
Figure 6C:
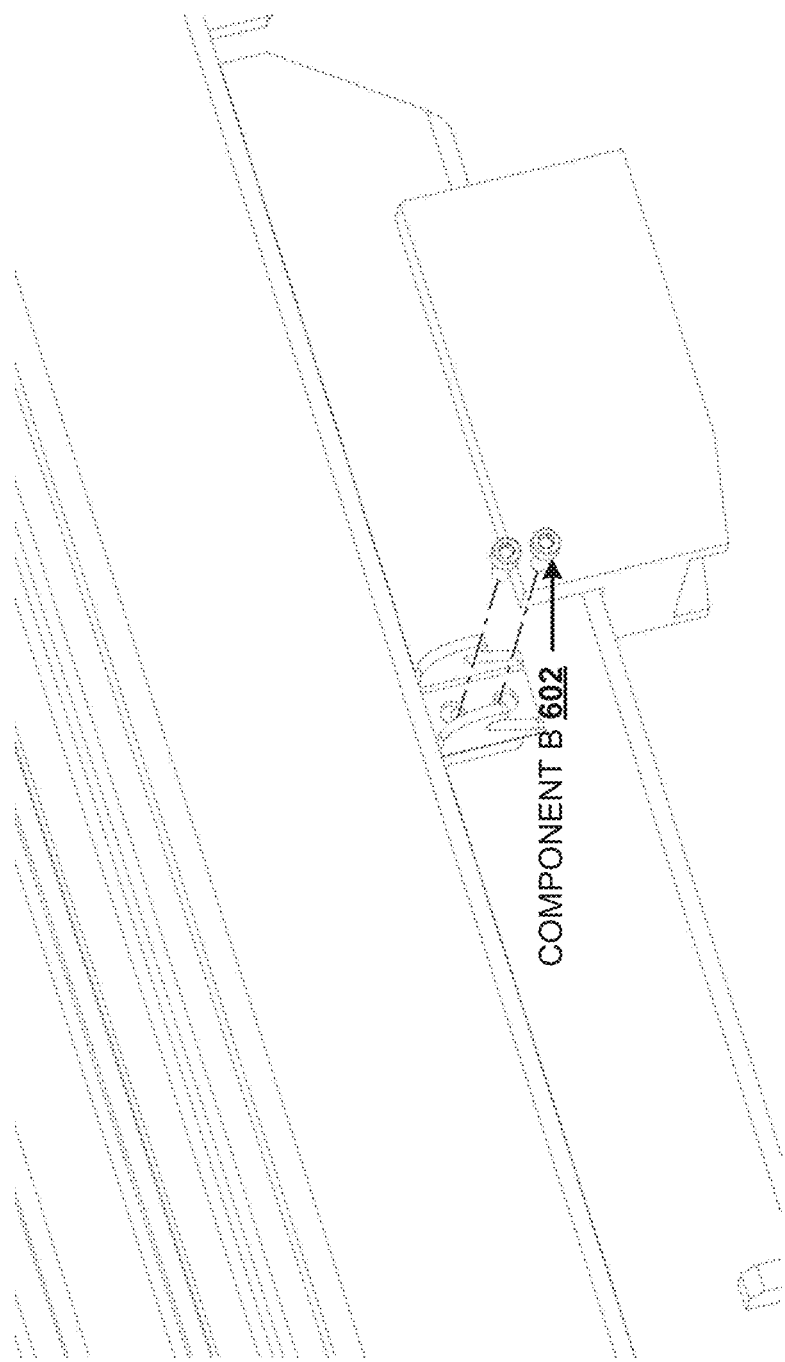
Figure 6D:
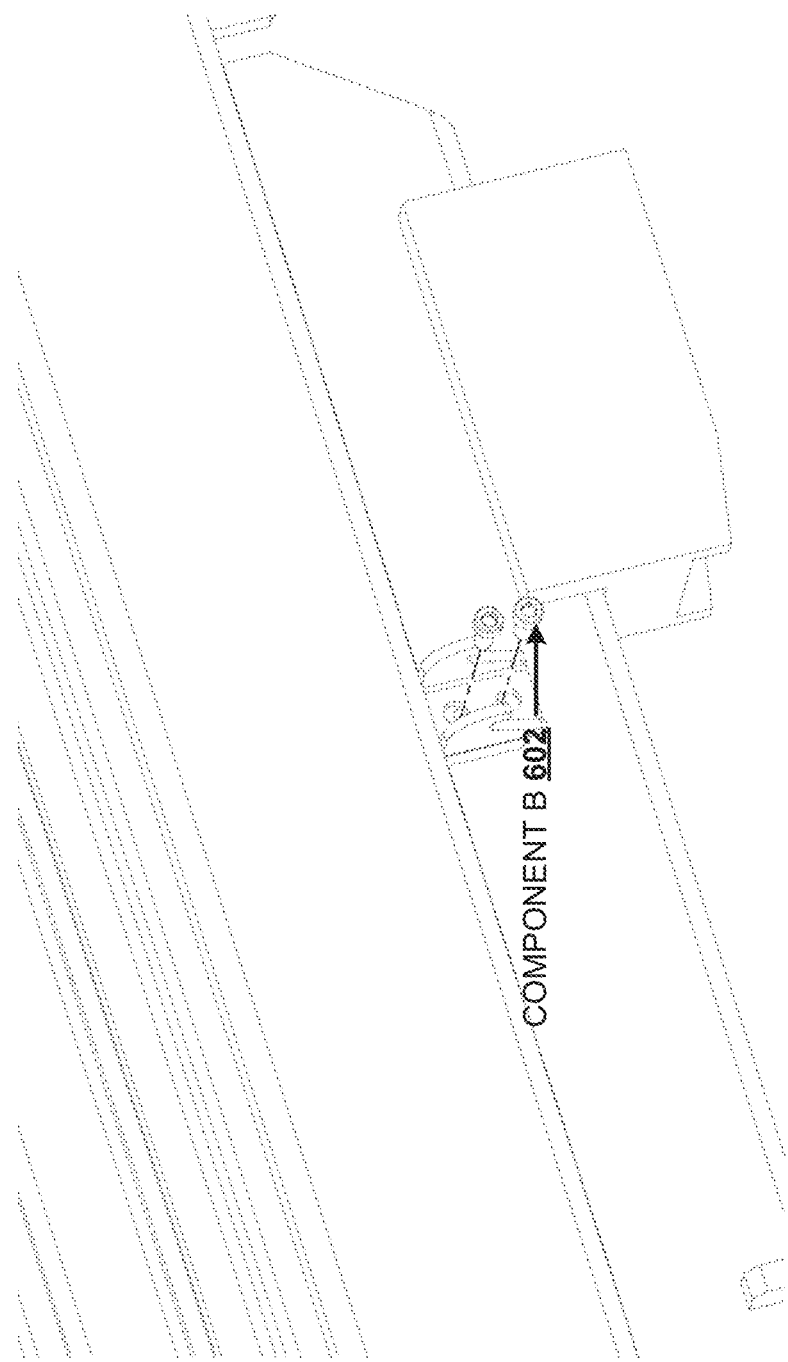
Figure 6E:
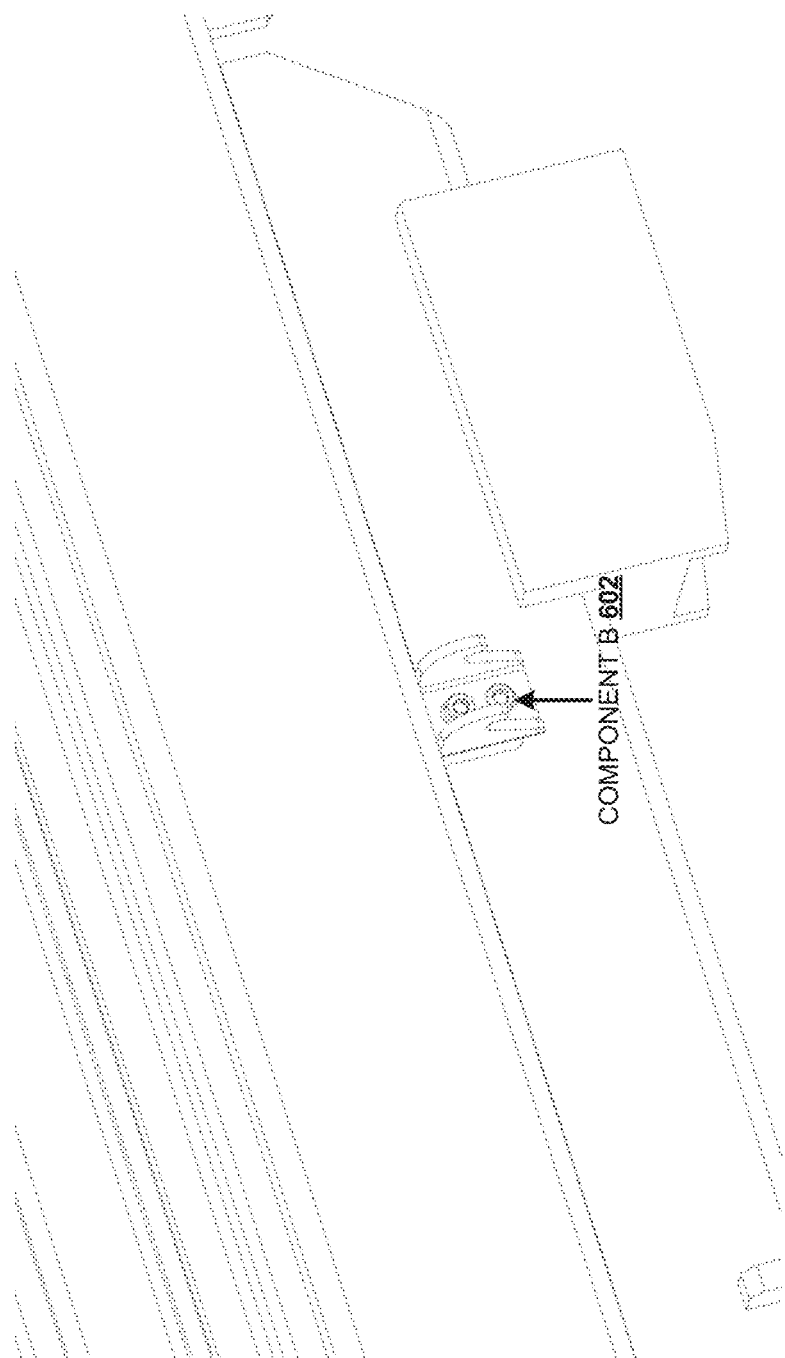

FIG. 6A-FIG. 6E illustrates assembling components of a product, according to one embodiment. An operator wearing a AR/VR wearable device such as a smart glass may continue assembling. The operator may pick up a second component/next component e.g. screw referred to as component 'B' 602 virtually by using a controller, or by a voice command 'next part', where the component 'B' 602 appears in the hand of the operator, based on the capability of the AR/VR application. The component 'B' 602 turns semi-opaque. Then the operator 'moves' the component 'B' 602 to install, the AR/VR device tracks the hand movement/gesture of the operator and the component 'follows' the hand movement. The hand movement of the operator is received as continuous visual motion signals referred to as trajectories corresponding to assembling the next component e.g., component 'B' 602. With a 'show installation' command, the component gets highlighted in its final location in the product to help the operator find the right location. As the operator 'moves' the component 'B' 602, it is moved closer to its destination as shown in FIG. 6B, and the gesture of hand movement is shown as dotted lines. Similarly, as the operator keeps moving his hand, continuous movements or gesture of the hand movement is captured as shown in FIG. 6C and FIG. 6D. Once the operator holds the component close to the final position the 'snap installation' command can be invoked to move the part to its final position as shown in FIG. 6E. The set of figures FIG. 6A to FIG. 6E are captured as the installation view of the next component e.g., component 'B' 602. Once the component is installed, the appearance of the component turns opaque. The sequence of these voice commands may be repeated to install the next component. This process is continued until all the components of the product are installed.

In one embodiment, when the 3D model of components is captured in the AR/VR application, an operator may specify or pre-configure the sequence of assembly of components. Such a pre-configuration enables dynamic validation of assembly of components such as determining if a correct component is chosen for assembly in the sequence. The dynamic validation of assembly of 3D models of components provide real-time feedback of the assembling process. The real-time feedback includes collision detection, error detection, solution proposal, etc. The AR/VR application has the capability to detect collisions and react accordingly, for example, it will not be possible to move one component through another component. In the example embodiments explained above with reference to FIG. 5A-FIG. 5C and FIG. 6A-FIG. 6E, the sequence of assembly is a clamp followed by a screw, where the clamp is mounted with two screws. In case the operator picks up the screw referred to as the component 'B' before the clamp referred to as the component 'A', and tries to assemble, AR/VR application validates the installation sequence of component 'B' and notifies the operator that the sequence is incorrect. The AR/VR application also provides the operator with information that component 'A' needs to be installed before component 'B'. Dynamic validation also includes determining whether the ergonomic requirements are fulfilled or not. For example, installing a component such as wheel from underneath is difficult, and hence it may be advantageous to have the product lifted to a position, where the point of installation is easier to reach. This would result in installing a lifting device at the work bench. In a different scenario, merely lifting the assembled product is not sufficient, it may be required to turn it by 45 degrees or 90 degrees. This would require a conveyor system that allows turning the product along its longitudinal axis. In case sufficient space is not available for the component to be installed, collision detection function of the AR/VR application will identify this and provide an error message that the installation cannot be performed along with a solution to address it. Thus, dynamic validation helps in verifying the sequence of assembly of products and also helps in designing the work bench.

With 'pause recording' command there is an option to pause the recording and resume at a later point of time. The voice command 'pause recording' may be referred to as a third voice command. Once all the components are installed, 'stop recording' command stops the recording the assembling process. The voice command 'stop recording' may be referred to as a fourth voice command. The recorded information is sent to AR/VR application and/or a visual enterprise application as animations along with the views. The operator can display the result of the recording with the 'play recording' command. Then the 'next part' command shows the motion/animation of the component. With the 'repeat part' the animation of installation of that component can be displayed again. The AR/VR application switches back to play mode after the 'snap installation' command. The installation sequence may be changed during replay with the 'back in sequence' command. The result of the recording may be stored in the AR/VR application as an animation assembly file. In one embodiment, the animation assembly file may be extracted from the AR/VR application and stored in a visual enterprise application as a visual enterprise format such as visual design stream. The interface between the AR/VR application and the visual enterprise application may be through interfaces such as application programming interfaces (API's).

Figure 7:
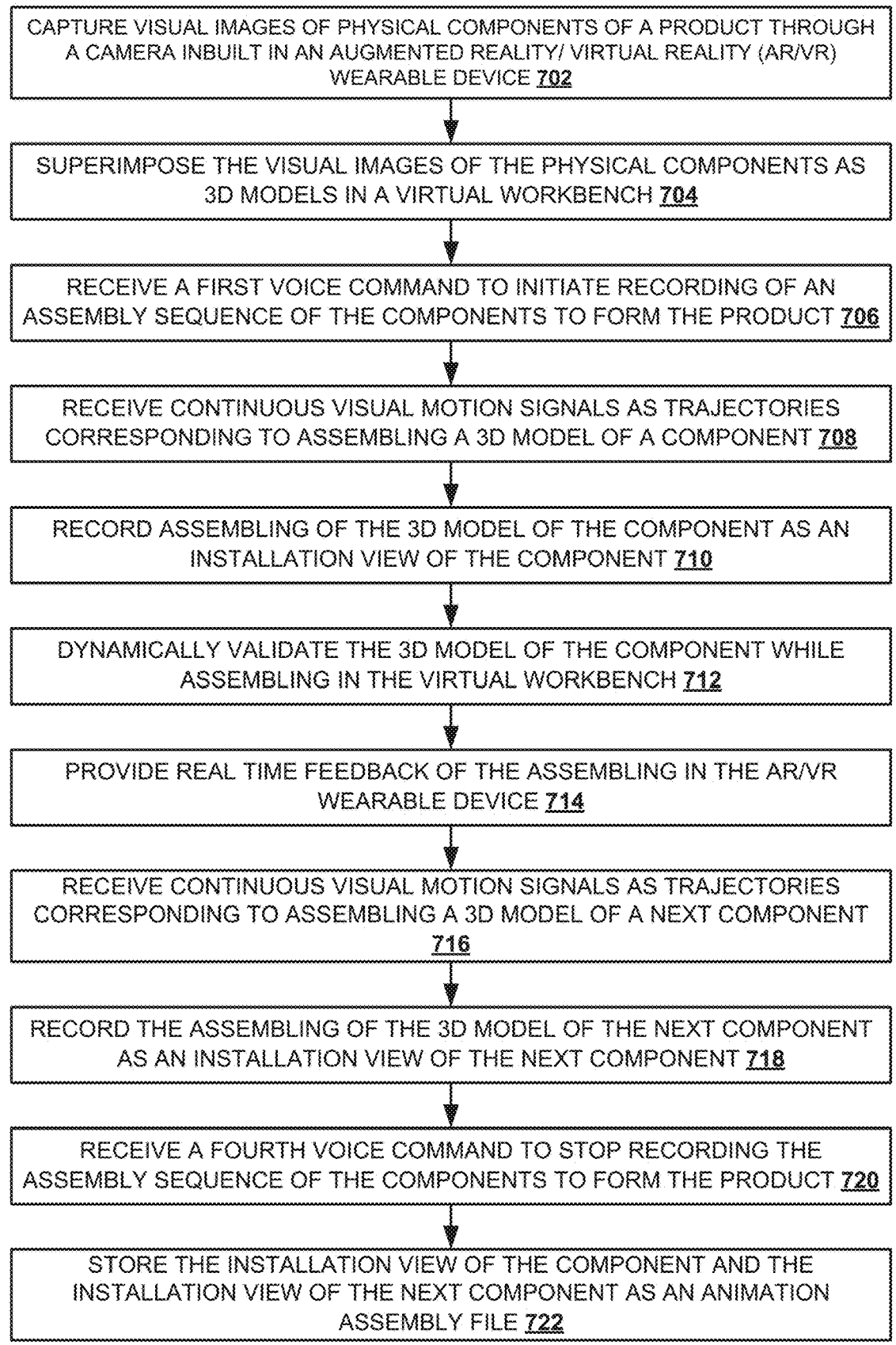
FIG. 7 is a flow chart illustrating a process of virtual prototyping and assembly validation, according to one embodiment.

FIG. 7 is flow chart illustrating a process of virtual prototyping and assembly validation, according to one embodiment. At 702, visual images of physical components of a product are captured through a camera inbuilt in an augmented reality/virtual reality (AR/VR) wearable device. At 704, the visual images of the physical components are registered as 3D models in a virtual workbench. For example, as shown in FIG. 4, various components of a product such as baggage cart is captured through the camera inbuilt in the AR/VR wearable device and registered as 3D models in a virtual workbench. The sequence of assembly of the various components in the baggage cart is pre-configured and provided as input from a visual enterprise application to a ME where the actual assembling of the baggage cart is performed. At 706, a first voice command is received to initiate recording of an assembly sequence of the components to form the product. At 708, continuous visual motion signals are received as trajectories corresponding to assembling a 3D model of a component. At 710, assembling of the 3D model of the component is recorded as an installation view of the component. For example, as explained in FIG. 5A-5C, in the ME, continuous motion signals of installation of component 'A' is received and recorded as installation view of the component. At 712, the 3D model of the component is dynamically validated while assembling the virtual workbench. At 714, real time feedback of assembling is provided in the AR/VR wearable device. For example, as explained with reference to FIG. 6A-6E, in case sufficient space is not available for the component to be installed, collision detection function of the AR/VR application will identify this and provide an error message that the installation cannot be performed. At 716, continuous visual motion signals corresponding to assembling a 3D model of a next component are received as trajectories. At 718, the assembling of the 3D model of the next component is recorded as an installation view of the next component. At 720, a fourth voice command is received to stop recording the assembly sequence of the components to form the product. At 722, the installation view of the component and the installation view of the next component is stored as an animation assembly file. For example, the animation assembly file may be extracted from the AR/VR application and stored in a visual enterprise application as a visual enterprise format such as visual design stream.

The visual prototyping and assembly validation has the following advantages. Based on the animation assembly file including the sequence of installation of the components of a product, the process of manufacturing the product is efficient. The animation assembly file provides a user/ operator with information on how to install. This planned sequence of assembly, i.e. the planned order in which the components are being assembled makes the virtual prototype build very efficient, which otherwise would be very cumbersome and time consuming. This also implies that the user does not have to choose and pick the components in the right order. Only in case of incorrect order/sequence, the user interference is required to adjust the order appropriately. The shop floor operator would receive the sequence of assembly as work instructions from the ME system. If the product is a relatively large product like aircraft, augmenting and virtualizing the components of the aircraft reduces the challenges faced by operators in real time work benches since they are guided precisely with the animation file. The assembly of the components in the product is dynamically validated on the fly saving time and human resource. The AR/VR application has the capability to provide information on the correct sequence of assembly and provide specific correction information when the operator goes wrong. AR/VR application is a sophisticated virtual prototyping and a guided assembly validation application.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
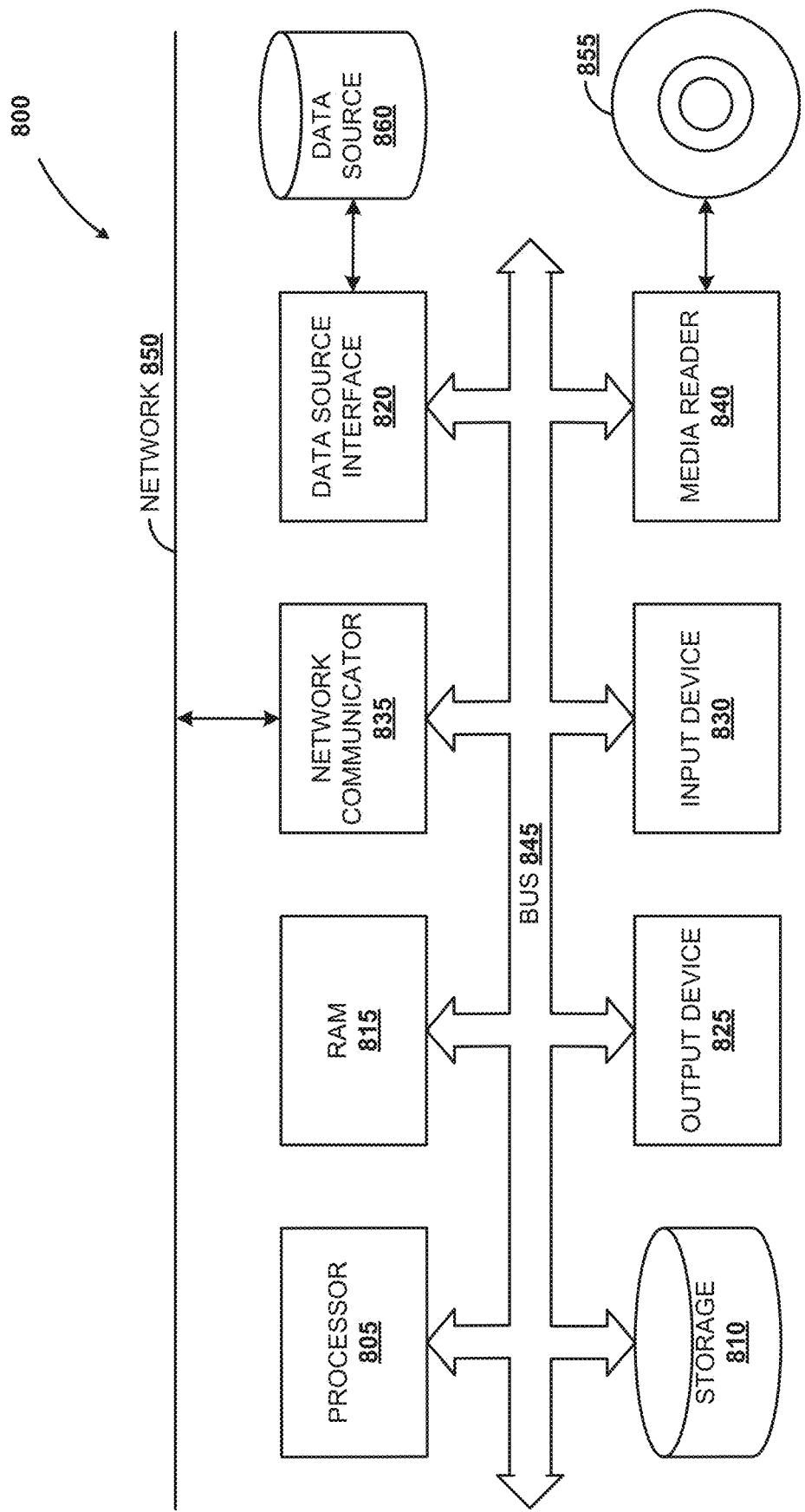
FIG. 8 is a block diagram of an exemplary computer system, according to one embodiment.

FIG. 8 is a block diagram of an exemplary computer system 800. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   capture visual images of physical components of a product through a camera inbuilt in an augmented reality/virtual reality (AR/VR) wearable device while an operator wears the AR/VR wearable device;
   superimpose the visual images of the physical components as 3D models in a virtual workbench as the operator visually views the 3D models in the virtual workbench through the AR/VR wearable device;
   receive continuous visual motion signals as trajectories corresponding to assembling one or more 3D models corresponding to one or more physical components, wherein movements and gestures of the operator are tracked by the AR/VR wearable device and are received as the continuous visual motion signals as the trajectories;
   record assembling of the one or more 3D models corresponding to one or more components as an installation view of the one or more physical components, wherein the assembling of the one or more components is in a pre-configured sequence, and wherein the assembling of the one or more components is performed by the operator wearing the AR/VR wearable device;
   dynamically validate assembly of the one or more 3D models of the physical components while assembling in the virtual workbench, wherein the dynamic validation of the assembly further comprises performing collision detection to determine whether each of the one or more 3D models of the physical components has sufficient physical space to be installed in the assembly of the one or more 3D models of the physical components; and
   process the installation view of the one or more physical components to covert to an animation assembly file.

2. The non-transitory computer-readable medium of claim 1, further comprises instructions which when executed by the computer further cause the computer to:
   receive a voice command to automatically receive and position a 3D model of a physical component in a hand of the operator in a virtual workbench;
   in response to the received 3D model of the physical component, record assembling the 3D model of the physical component in the virtual workbench;
   receive a pause recording voice command to pause recording of the assembling the 3D model of the physical component in the virtual workbench; and
   receive a resume recording voice command to resume recording of the assembling the 3D model of the physical component in the virtual workbench.

3. The non-transitory computer-readable medium of claim 1, further comprises instructions which when executed by the computer further cause the computer to:
   recognize gestures of the operator as the continuous visual motion signals by a gesture recognition system in the AR/VR wearable device; and
   recognize speech of the operator as voice commands by a speech recognition system in the AR/VR wearable device.

4. The non-transitory computer-readable medium of claim 1, wherein the one or more 3D models are positioned in the virtual workbench based on data points associated with the physical components.

5. The non-transitory computer-readable medium of claim 1,
   wherein the dynamic validation of the assembly further comprises performing collision detection to determine whether each 3D model of the one or more 3D models of the physical components would collide with any other 3D model of the one or more 3D models of the physical components, and wherein the non-transitory computer-readable medium further comprises instructions which when executed by the computer further cause the computer to provide real time feedback of the assembling in the AR/VR wearable device.

6. The non-transitory computer-readable medium of claim 1, further comprises instructions which when executed by the computer further cause the computer to:
   based on the dynamic validation, determine whether the one or more 3D models of the physical components follow a pre-defined sequence of assembly; and upon determining that the pre-defined sequence of assembly of the 3D models of the physical components is not followed, provide an error message in the AR/VR wearable device in real-time along with a solution.

7. The non-transitory computer-readable medium of claim 6, further comprises instructions which when executed by the computer further cause the computer to:
provide an interface between the AR/VR wearable device and a visual enterprise application, wherein the interface is an application programming interface; and
using the interface, send the animation assembly file to the visual enterprise application.

8. A computer-implemented method of virtual prototyping and assembly validation, the method comprising:
capturing visual images of physical components of a product through a camera inbuilt in an augmented reality/virtual reality (AR/VR) wearable device while an operator wears the AR/VR wearable device;
superimposing the visual images of the physical components as 3D models in a virtual workbench as the operator visually views the 3D models in the virtual workbench through the AR/VR wearable device;
receiving continuous visual motion signals as trajectories corresponding to assembling one or more 3D models corresponding to one or more physical components, wherein movements and gestures of the operator are tracked by the AR/VR wearable device and are received as the continuous visual motion signals as the trajectories;
recording assembling of the one or more 3D models corresponding to one or more components as an installation view of the one or more physical components, and wherein the assembling of the one or more components is performed by the operator wearing the AR/VR wearable device;
dynamically validating assembly of the one or more 3D models of the physical components while assembling in the virtual workbench, wherein dynamically validating the assembly further comprises performing collision detection to determine whether each of the one or more 3D models of the physical components has sufficient physical space to be installed in the assembly of the one or more 3D models of the physical components; and
processing the installation view of the one or more physical components to covert to an animation assembly file.

9. The method of claim 8, further comprising:
receiving a voice command to automatically receive and position a 3D model of a physical component in a hand of the operator in a virtual workbench;
in response to the received 3D model of the physical component, recording assembling the 3D model of the physical component in the virtual workbench;
receiving a pause recording voice command to pause recording of the assembling the 3D model of the physical component in the virtual workbench; and
receiving a resume recording voice command to resume recording of the assembling the 3D model of the physical component in the virtual workbench.

10. The method of claim 8, further comprising:
recognizing gestures of the operator as the continuous visual motion signals by a gesture recognition system in the AR/VR wearable device; and
recognizing speech of the operator as voice commands by a speech recognition system in the AR/VR wearable device.

11. The method of claim 8, wherein the one or more 3D models are positioned in the virtual workbench based on data points associated with the physical components.

12. The method of claim 8,
wherein dynamically validating the assembly further comprises performing collision detection to determine whether each 3D model of the one or more 3D models of the physical components would collide with any other 3D model of the one or more 3D models of the physical components, and wherein the method further comprises providing real time feedback of the assembling in the AR/VR wearable device.

13. The method of claim 8, further comprising:
based on dynamically validating the assembly, determining whether the one or more 3D models of the physical components follow a pre-defined sequence of assembly; and
upon determining that the pre-defined sequence of assembly of the 3D models of the physical components is not followed, providing an error message in the AR/VR wearable device in real-time along with a solution.

14. The method of claim 13, further comprising:
providing an interface between the AR/VR wearable device and a visual enterprise application, wherein the interface is an application programming interface; and
using the interface, sending the animation assembly file to the visual enterprise application.

15. A computer system for virtual prototyping and assembly validation, comprising:
a computer memory to store program code; and
a processor to execute the program code to:
capture visual images of physical components of a product through a camera inbuilt in an augmented reality/virtual reality (AR/VR) wearable device while an operator wears the AR/VR wearable device;
superimpose the visual images of the physical components as 3D models in a virtual workbench as the operator visually views the 3D models in the virtual workbench through the AR/VR wearable device;
receive continuous visual motion signals as trajectories corresponding to assembling one or more 3D models corresponding to one or more physical components, wherein movements and gestures of the operator are tracked by the AR/VR wearable device and are received as the continuous visual motion signals as the trajectories;
record assembling of the one or more 3D models corresponding to one or more components as an installation view of the one or more physical components, and wherein the assembling of the one or more components is performed by the operator wearing the AR/VR wearable device;
dynamically validate assembly of the one or more 3D models of the physical components while assembling in the virtual workbench, wherein the dynamic validation of the assembly further comprises performing collision detection to determine whether each of the one or more 3D models of the physical components has sufficient physical space to be installed in the assembly of the one or more 3D models of the physical components; and
process the installation view of the one or more physical components to covert to an animation assembly file.

16. The computer system of claim 15, wherein the processor further executes the program code to:

receive a voice command to automatically receive and position a 3D model of a physical component in a hand of the operator in a virtual workbench;

in response to the received 3D model of the physical component, record assembling the 3D model of the physical component in the virtual workbench;

receive a pause recording voice command to pause recording of the assembling the 3D model of the physical component in the virtual workbench; and receive a resume recording voice command to resume recording of the assembling the 3D model of the physical component in the virtual workbench.

17. The computer system of claim 15, wherein the processor further executes the program code to:

recognize gestures of the operator as the continuous visual motion signals by a gesture recognition system in the AR/VR wearable device; and recognize speech of the operator as voice commands by a speech recognition system in the AR/VR wearable device.

18. The computer system of claim 15, wherein the one or more 3D models are positioned in the virtual workbench based on data points associated with the physical components.

19. The computer system of claim 15, wherein the dynamic validation of the assembly further comprises performing collision detection to determine whether each 3D model of the one or more 3D models of the physical components would collide with any other 3D model of the one or more 3D models of the physical components, and wherein the processor further executes the program code to provide real time feedback of the assembling in the AR/VR wearable device.

20. The computer system of claim 15, wherein the processor further executes the program code to:

based on the validation, determine whether the one or more 3D models of the physical components follow a pre-defined sequence of assembly; and upon determining that the pre-defined sequence of assembly of the 3D models of the physical components is not followed, provide an error message in the AR/VR wearable device in real-time along with a solution.

* * * * *